United States Patent
Kimura et al.

(10) Patent No.: US 12,024,657 B2
(45) Date of Patent: Jul. 2, 2024

(54) ADHESIVE TAPE

(71) Applicant: DENKA COMPANY LIMITED, Tokyo (JP)

(72) Inventors: Akiyoshi Kimura, Ichihara (JP); Daisuke Yoshimura, Ichihara (JP)

(73) Assignee: Denka Company Limited, Tokyo (JP)

( * ) Notice: Subject to any disclaimer, the term of this patent is extended or adjusted under 35 U.S.C. 154(b) by 786 days.

(21) Appl. No.: 17/059,973

(22) PCT Filed: Feb. 15, 2019

(86) PCT No.: PCT/JP2019/005558
§ 371 (c)(1),
(2) Date: Nov. 30, 2020

(87) PCT Pub. No.: WO2019/230067
PCT Pub. Date: Dec. 5, 2019

(65) Prior Publication Data
US 2021/0214586 A1     Jul. 15, 2021

(30) Foreign Application Priority Data

May 30, 2018 (JP) ................. 2018-103942

(51) Int. Cl.
*C09J 7/38* (2018.01)
*C09J 7/24* (2018.01)
*C09J 11/06* (2006.01)

(52) U.S. Cl.
CPC .............. *C09J 7/383* (2018.01); *C09J 7/245* (2018.01); *C09J 11/06* (2013.01); *C09J 2301/122* (2020.08); *C09J 2301/16* (2020.08); *C09J 2301/408* (2020.08); *C09J 2301/41* (2020.08); *C09J 2400/10* (2013.01); *C09J 2400/20* (2013.01); *C09J 2407/00* (2013.01); *C09J 2427/006* (2013.01)

(58) Field of Classification Search
None
See application file for complete search history.

(56) References Cited

U.S. PATENT DOCUMENTS

| 3,129,816 A | 4/1964 | Bond et al. |
|---|---|---|
| 2002/0064651 A1 | 5/2002 | Kinoshita et al. |
| 2008/0149251 A1 | 6/2008 | Mundt et al. |
| 2009/0252958 A1 | 10/2009 | Nishijima et al. |
| 2010/0210745 A1* | 8/2010 | McDaniel ............... C09D 7/48 521/55 |
| 2013/0011674 A1 | 1/2013 | Nishijima et al. |
| 2016/0053139 A1 | 2/2016 | Arantes et al. |
| 2016/0289505 A1 | 10/2016 | Harada et al. |
| 2016/0289506 A1 | 10/2016 | Harada et al. |
| 2018/0086945 A1* | 3/2018 | Harada ................... C09J 7/245 |
| 2019/0039208 A1 | 2/2019 | Hida et al. |

FOREIGN PATENT DOCUMENTS

| EP | 1312657 A2 | 5/2003 |
|---|---|---|
| JP | H06158007 A | 6/1994 |
| JP | H10338856 A | 12/1998 |
| JP | H11228917 A | 8/1999 |
| JP | 2001240828 A | 9/2001 |
| JP | 2009249510 A | 10/2009 |
| JP | 2013100438 A | 5/2013 |
| JP | 2016524632 A | 8/2016 |
| JP | 2017119806 A | 7/2017 |
| JP | 2017200978 A | 11/2017 |
| WO | 2017130678 A1 | 8/2017 |

OTHER PUBLICATIONS

Japanese Office Action dated Oct. 11, 2022, issued in corresponding JP Application No. 2020-521692, 11 pages.
Extended European Search Report mailed Jul. 14, 2021, issued in corresponding International Application No. PCT/JP2019/005558, filed Feb. 15, 2019, 8 pages.
International Search Report mailed Apr. 9, 2019, issued in corresponding International Application No. PCT/JP2019/005558, filed Feb. 15, 2019, 2 pages.

* cited by examiner

*Primary Examiner* — Jeffrey D Washville
(74) *Attorney, Agent, or Firm* — Christensen O'Connor Johnson Kindness PLLC

(57) ABSTRACT

An object of the present invention is to provide an adhesive tape having flexibility even at a low temperature, having excellent adhesive force at low temperature and after a certain period, and having excellent holding force after a certain period, and suppressing adhesive residue at peeling off even after being left for a certain period.
According to the present invention, provided is an adhesive tape comprising a substrate and an adhesive layer, wherein the adhesive layer is formed directly on the substrate or with another layer therebetween, the substrate contains a polyvinyl chloride resin, a plasticizer, and a zinc compound, a content of the plasticizer in the substrate is 30 to 50 mass % with respect to the total mass of the substrate, a content of a zinc atom in the substrate is 0.01 to 0.15 mass % with respect to the total mass of the substrate, and the adhesive layer contains an adhesive component and a vulcanizing agent.

6 Claims, No Drawings

ADHESIVE TAPE

TECHNICAL FIELD

The present invention relates to an adhesive tape which is flexible even at a low temperature and has excellent adhesive force at low temperature and after a certain period, and excellent holding force after a certain period.

BACKGROUND ART

Adhesive tapes are used as the protective film, and PVC (polyvinyl chloride) tape is used because of its excellent flexibility. Further, in wire harness applications, thinning of the PVC substrate is also required for thinning, and a large amount of plasticizer is contained in the substrate to prevent cracks, and realize flexibility even at low temperatures (Patent Literature 1).

CITATION LIST

Patent Literature

Patent Literature 1: JP2017-119806
Patent Literature 2: JP2017-200978

SUMMARY OF INVENTION

Technical Problem

However, when the substrate contains a large amount of plasticizer, when the tape is peeled off after being left for a certain period, dirt may adhere to the surface of the adherend due to a decrease in holding force. Further, there is a method of adding alkylphenols or the like in order to improve such problem (Patent Literature 2), but the adhesive force deteriorates instead.

The present invention has been made by taking the above circumstances into consideration. An object of the present invention is to provide an adhesive tape having flexibility even at a low temperature, having excellent adhesive force at low temperature and after a certain period, and having excellent holding force after a certain period, and suppressing adhesive residue at peeling off even after being left for a certain period.

Solution to Problem

According to the present invention, provided is an adhesive tape comprising a substrate and an adhesive layer, wherein the adhesive layer is formed directly on the substrate or with another layer therebetween, the substrate contains a polyvinyl chloride resin, a plasticizer, and a zinc compound, a content of the plasticizer in the substrate is 30 to 50 mass % with respect to the total mass of the substrate, a content of a zinc atom in the substrate is 0.01 to 0.15 mass % with respect to the total mass of the substrate, and the adhesive layer contains an adhesive component and a vulcanizing agent.

The inventors have conducted intensive studies, and have found that when the substrate contains a predetermined amount of zinc atoms and a predetermined amount of plasticizer, and the adhesive layer contains a vulcanizing agent, the adhesive tape has flexibility even at low temperature, the adhesive force at low temperature and after a certain period and the holding force after a certain period were excellent, and can suppress adhesive residue at peeling off even after being left for a certain period.

Hereinafter, various embodiments of the present invention are exemplified. The following embodiments can be combined with each other.

Preferably, the plasticizer is a carboxylic acid ester.

Preferably, a content of the vulcanizing agent is 0.1 to 5 mass % with respect to the total mass of the adhesive layer.

Preferably, the adhesive further contains a vulcanizing auxiliary.

Preferably, the zinc compound is zinc stearate, zinc laurate, zinc oleate, zinc benzoate, zinc butyl benzoate, zinc amino acid, or zinc phosphate ester.

Preferably, the adhesive tape further comprises a primer layer between the adhesive layer and the substrate.

Preferably, the adhesive layer has a film thickness of 25 to 45 μm.

DESCRIPTION OF EMBODIMENTS

Hereinafter, various embodiments of the present invention will be described. Various distinctive features shown in the following embodiments can be combined with each other. In addition, an invention can be established independently for each of the distinctive features.

1. Constitution of Adhesive Tape

An adhesive tape of the present invention comprises a substrate and an adhesive layer. The adhesive layer is formed directly on the substrate or with another layer therebetween.

1-1. Substrate

The substrate contains a polyvinyl chloride resin, a plasticizer, and a zinc compound.

<Polyvinyl Chloride Resin>

The polyvinyl chloride resin of the present invention is not particularly limited, but preferably has a average degree of polymerization of 1000 to 1500, and two or more polyvinyl chloride resins having different average degree of polymerization can be used. When the average degree of polymerization is lower than 1000, the resin becomes too soft during substrate processing, and the film forming property can be deteriorated. When the average degree of polymerization is higher than 1500, the substrate becomes hard, and the following property of the tape with the adherend when the tape is wound onto the adherend can be deteriorated.

The content of the polyvinyl chloride resin in the substrate is preferably 50 to 70 mass %, more preferably 58 to 68 mass % with respect to the total mass of the substrate. When the content of the polyvinyl chloride resin exceeds 70 mass %, the processability deteriorates and it is difficult to form a film. Further, when the content of the polyvinyl chloride resin is less than 50 mass %, the strength of the substrate is lowered.

<Plasticizer>

The plasticizer is not particularly limited, but is preferably a carboxylic acid ester and the like, more preferably a trimellitic acid ester, an adipate ester, a phthalate ester and the like, and further preferably a phthalate ester. These compounds may be used alone or in combination of two or more.

Examples of phthalates include diisodecyl phthalate (DIDP), diisononyl phthalate (DINP), di (2-ethylhexyl) phthalate (DEHP), dibutyl phthalate (DVP), dinormal octyl phthalate (DNOP), and the like. Among these, diisodecyl phthalate or diisononyl phthalate is preferable, and diisodecyl phthalate is more preferable.

The content of the plasticizer in the substrate is 30 to 50 mass %, preferably 32 to 40 mass % with respect to the total mass of the substrate. When the content is less than 30 mass %, the flexibility of the adhesive tape is not sufficient, the adhesive force at a low temperature is low, and the adhesive residue may occur at peeling off after being left for a certain period due to a decrease in holding force. When the content exceeds 50 mass %, the adhesive force at low temperature is low, the adhesive force after being left for a certain period is low, and the adhesive residue may occur at peeling off after being left for a certain period due to a decrease in holding force <Zinc Compound>

The zinc compound is not limited as long as the compound contains a zinc atom, but is, for example, an inorganic zinc compound or an organic zinc compound, preferably an organoacid zinc salt.

Examples of the organic zinc salt include zinc stearate, zinc laurate, zinc oleate, zinc benzoate, zinc butyl benzoate, zinc amino acid, zinc phosphate ester and the like. Among these, zinc stearate and zinc laurate are preferable, and zinc stearate is more preferable.

The content of a zinc atom in the substrate is 0.01 to 0.15 mass %, preferably 0.05 to 0.15 mass % with respect to the total mass of the substrate. When the content is less than 0.01 mass %, adhesive residue may occur due to a decrease in holding force after a certain period. When the content exceeds 0.15 mass %, the adhesive force, particularly the adhesive force after being left for a certain period may decrease.

<Other Components>

Here, if necessary, the substrate of the present invention can include, in a range which does not impair the effect of the present invention, an inorganic filler, a modifier, and other additives such as a colorant, a stabilizer, an antioxidant, and an ultraviolet absorber, lubricants and the like.

1-2. Adhesive Layer

The adhesive constituting the adhesive layer includes an adhesive component and a vulcanizing agent.

<Adhesive Component>

The adhesive component preferably contains a rubber-based adhesive component. The rubber-based adhesive component may be either a solvent type or an emulsion type. The rubber-based adhesive component preferably contains one or more rubbers selected from natural rubbers or synthetic rubbers. Further, the adhesive preferably further contains a tackifier as an adhesive component. Further, the adhesive component is more preferably a mixture of natural rubber, synthetic rubber, and a tackifier. The content of the tackifier is preferably 50 to 150 parts by mass with respect to 100 parts by mass of the rubber component of the mixture containing natural rubber and synthetic rubber.

Examples of the natural rubber and the synthetic rubber include a natural rubber-methyl methacrylate copolymer latex, a styrene-butadiene copolymer, an acrylonitrile-butadiene copolymer, and a methyl methacrylate-butadiene copolymer. These may be used alone or in combination of two or more.

The tackifier can be selected in consideration of the softening point, compatibility with each component, and the like. Examples of the tackifier includes emulsions of terpene resin, rosin resin, hydrogenated rosin resin, kumaron inden resin, styrene resin, aliphatic petroleum resin, alicyclic petroleum resin, terpene-phenol resin, xylene resin, and other aliphatic hydrocarbon or aromatic hydrocarbon resins. These may be used alone or in combination of two or more.

The rubber-based adhesive component can be freely selected from a solvent type and an emulsion type, but an emulsion type in which the amount of VOC generated is little is preferable.

The adhesive layer preferably has a film thickness of 25 to 45 µm.

<Vulcanizing Agent>

The vulcanizing agent is not limited as long as it is a substance capable of cross-linking the polymer chains of rubber contained in the adhesive in a network shape, and examples thereof include sulfur and sulfur compounds. Examples of sulfur include powdered sulfur, precipitated sulfur, colloidal sulfur, surface-treated sulfur, insoluble sulfur and the like. Examples of sulfur compounds include sulfur chloride, sulfur dichloride, high molecular weight polysulfides, morpholine disulfides (4,4'-dithiodimorpholine), alkylphenol disulfides, tetramethylthiuram disulfides, dipentamethylene thiuram tetrasulfide, and selenium dimethyldithiocarbamate.

Among these, sulfur compounds are preferable, and morpholine disulfide is particularly preferable. These sulfurs and sulfur compounds are used alone or in combination of two or more.

The content of the vulcanizing agent is preferably 0.1 to 5 mass %, more preferably 0.4 to 2.5 mass %, and further preferably 0.5 to 2 mass % with respect to the total mass of the adhesive layer. When the content is less than 0.1 mass %, adhesive residue may occur due to a decrease in holding force after being left for a certain period. When the content exceeds 5 mass %, the adhesive force, particularly the adhesive force after being left for a certain period may decrease.

The vulcanizing agent is preferably used in combination with a vulcanizing auxiliary. Examples of the vulcanizing auxiliary include sulfenamide compounds such as N-cyclohexyl-2-benzothiazolesulfenamide, N-oxydiethylene-2-benzothiazolsulfenamide, N, N-diisopropyl-2-benzothiazolsulfenamide; thiazole compounds such as 2-mercaptobenzothiazole, 2-(2',4'-dinitrophenyl) mercaptobenzothiazole, 2-(4'-morpholinodithio) benzothiazole, di-2-dibenzothiazyldisulfide (MBTS); guanidine compounds such as diphenylguanidine, diorsotril guanidine, diorsonitrile guanidine, orthonitrile biguanide, diphenylguanidine phthalate; aldehyde amines or aldehyde-ammonia compounds such as acetaldehyde-aniline reactants, butyraldehyde-aniline condensates, hexamethylenetetramine, acetaldehyde ammonia; imidazoline compounds such as 2-mercapto imidazoline; thioyuria compounds such as thiocarbanilide, diethylthioyuria, dibutylthioyuria, trimethylthioyuria, diorsotrilthioyuria; thiuram compounds such as tetramethylthiuram monosulfide, tetraethylthiuram disulfide, tetrabutylthiuram disulfide; dithioate compounds such as zinc dimethyldithiocarbamate, zinc diethyldithiocarbamate, zinc di-n-butyldithiocarbamate (ZnBDC), zinc ethylphenyldithiocarbamate, zinc butylphenyldithiocarbamate, sodium dimethyldithiocarbamate, tellurium dimethyldithiocarbamate; zantate compounds such as zinc dibutylxanthate; Zinc oxide (zinc oxide).

1-3. Other Layers

The adhesive tape of the present invention may be provided with a primer layer (undercoating agent layer) for the purpose of improving the adhesion between the substrate and the adhesive layer, if necessary, as long as the effect of the present invention is not impaired. The thickness of the primer layer is, for example 0.1 to 1 µm, preferably 0.3 to 0.5 µm.

The primer forming the primer layer preferably contains a graft polymer obtained by graft-polymerizing methyl methacrylate to natural rubber and an acrylonitrile-butadiene copolymer. More specifically, the primer contains a compound obtained by grafting methyl methacrylate to natural rubber, and a carboxy group-modified acrylonitrile butadiene rubber. The amount of the acrylonitrile-butadiene copolymer is preferably 25 to 300 parts by mass with respect to 100 parts by mass of the graft polymer obtained by graft-polymerizing methyl methacrylate to natural rubber.

The graft polymer obtained by graft-polymerizing methyl methacrylate to the natural rubber used as the primer is preferably a graft polymer in which 70 to 50 mass % of natural rubber is graft-polymerized with 30 to 50 mass % of methyl methacrylate. When the ratio of the methyl methacrylate in the graft polymer is less than 30 mass %, the adhesion between the methyl methacrylate and the film substrate is deteriorated, and the adhesive tape may be delaminated. When the ratio of the methyl methacrylate is more than 50 mass %, the primer itself is cured and cannot follow the deformation of the substrate, so that the adhesive tape may be delaminated.

Examples of the acrylonitrile-butadiene copolymer used for the primer includes a medium nitrile type (acrylonitrile 25 to 30 mass %, butadiene 75 to 70 mass %) and a medium-high nitrile type (acrylonitrile 31 to 35 mass %, butadiene 69 to 65 mass %), a high nitrile type (acrylonitrile 36 to 43 mass %, butadiene 64 to 57 mass %) and the like. These may be used alone or in combination of two or more.

2. Manufacturing Method for Adhesive Tape
<Manufacturing Method for Substrate>

The substrate of the present invention can be obtained by melt-kneading a resin composition in which a polyvinyl chloride resin, a plasticizer, a zinc compound, other components and the like are mixed. The melt-kneading method is not particularly limited, but various mixers and kneaders equipped with a heating device such as a twin-screw extruder, a continuous type and batch type kneader, a roll, and a Banbury mixer can be used. The above resin composition is mixed to be uniformly dispersed, and the obtained mixture is molded into the substrate by a conventional molding method such as a calendar method, a T-die method, or an inflation method. A calendar molding machine is preferable as the molding machine from the viewpoints of productivity, color change, shape uniformity, and the like. The roll arrangement in calendar molding is, for example, known arranges such as L-type, inverted L-type, and Z-type, and the roll temperature is, for example, set to 150 to 200° C., preferably 155 to 190° C. The thickness of the substrate varies depending on the purpose of use, application and the like, but is, for example 40 to 450 μm, more preferably 50 to 200 μm, and even more preferably 55 to 100 μm.

<Formation of Primer Layer and Adhesive Layer>

The adhesive tape in the present invention can be obtained by applying the adhesive mixed with the vulcanizing agent to one side of the substrate and sufficiently removing the solvent in a drying oven to form the adhesive layer. In another embodiment, the primer is applied to one side of the substrate, the solvent is sufficiently removed in a drying oven. Then, the adhesive tape can be obtained by applying the adhesive thereto and sufficiently removing a solvent in a drying oven. A layer containing a compound obtained by grafting methyl methacrylate to natural rubber and a carboxy group-modified acrylonitrile butadiene rubber may be formed on the surface of the substrate in advance. Examples of the primer coating method include a gravure method, a spray method, a kiss roll method, a bar method, a knife method. Examples of the adhesive coating method include a comma method, a lip die method, a gravure method, a roll method, and slot die method.

3. Properties and Applications of Adhesive Tape

The adhesive tape of the present invention preferably satisfies the following properties, and can be used for binding a protective film, a wire harness, or the like.

3-1. Flexibility
<Flexibility at Low Temperature>

The polyvinyl chloride-based substrate of the present invention has a storage elastic modulus (E') at −30° C., of $1.5 \times 10^9$ Pa or less, and a tensile elongation rate at −30° C., of 80% or more. When the storage elastic modulus (E') is higher than $1.5 \times 10^9$ Pa, the tensile elongation rate at −30° C., is less than 80%, so that the tape wound onto the wire cracks at bending at −30° C.

3-2. Adhesive Force
<Room Temperature Adhesive Force (25° C.) after Storing at 120° C., for 3 Hours>

The adhesive tape of the present invention is stored at 120° C., for 3 hours, and then the adhesive force (180° peeling adhesive strength) is measured in accordance with the "adhesive tape/adhesive sheet test method" specified in JIS Z 0237. The adhesive force is preferably 1.7 N/10 mm or more, more preferably 1.8 N/10 mm or more, and further preferably 2 N/10 mm or more.

<Low Temperature Adhesive Force (−20° C.)>

The adhesive force (180° peeling adhesive force) of the adhesive tape of the present invention is measured at −20° C., in accordance with the "adhesive tape/adhesive sheet test method" specified in JIS Z0237. The adhesive force is preferably 1.5 N/10 mm or more, more preferably 1.7 N/10 mm or more, and further preferably 2 N/10 mm or more.

3-3. Holding Force
<Holding Force after Storing at 120° C., for 4 Hours>

The adhesive tape of the present invention is stored at 120° C., for 4 hours, and then the holding force is measured in accordance with JIS Z 0237. After leaving the tape (test tape) to stand for 24 hours or more in an evaluation test room set under a temperature of 23±2° C., and a humidity of 50±5% RH, the test tape having the size of 20×20 mm is attached to glass as an adherend. Then, a load of 100 g is applied in the direction of gravity at 100° C., and the falling time (minutes) of the weight is measured at n=3 or more.

EXAMPLES

Hereinafter, the present invention will be explained in further detail with reference to the Examples. Here, these examples are merely presented as an example, and shall not limit the present invention.

<Flexibility at Low Temperature: Storage Elastic Modulus (E') at −30° C.>

"Storage elastic modulus" was measured by a dynamic viscoelasticity measurement. A tape sample for dynamic viscoelasticity measurement having a thickness of 100 μm is stored in a room under 23° C., and a relative humidity of 50% RH for 24 hours or more. Then, stress and strain in the tensile direction at a frequency of 1 Hz are applied to the tape sample for measurement using the following device to measure a storage elastic modulus at −30° C.

Equipment: Dynamic Viscoelasticity Measuring Device RSA3 Manufactured by TA Instruments The measurement results were evaluated as follows.
A: Storage elastic modulus is $1.5 \times 10^9$ Pa or less
B: Storage elastic modulus is higher than $1.5 \times 10^9$ Pa <Room Temperature Adhesive Force (25° C.) after Storing at 120° C., for 3 Hours>

After storing the adhesive tape at 120° C., for 3 hours, the adhesive force (180° peeling adhesive force) of the adhesive tape was measured in accordance with the "adhesive tape/adhesive sheet test method" specified in JIS Z 0237.

<Low Temperature Adhesive Force (−20° C.)>

The adhesive force (180° peeling adhesive strength) of the adhesive tape was measured at −20° C., in accordance with the "adhesive tape/adhesive sheet test method" specified in JIS Z 0237.

<Holding Force after Storing at 120° C., for 4 Hours>

The adhesive tape of the present invention was stored at 120° C., for 4 hours, and then the holding force was measured in accordance with JIS Z 0237. After leaving the tape (test tape) to stand for 24 hours or more in an evaluation test room set under a temperature of 23±2° C., and a humidity of 50±5% RH, the test tape having the size of 20×20 mm was attached to glass as an adherend. Then, a load of 100 g was applied in the direction of gravity at 100° C., and the falling time (minutes) of the weight was measured at n=3 or more.

The following reagents were used in Examples and Comparative Examples, respectively.

TH-1000: Polyvinyl chloride resin (manufactured by Taiyo Vinyl Corporation, average degree of polymerization: 1000)

DINP: Diisononyl phthalate (manufactured by J-PLUS Co., Ltd.)

DIDP: Diisodecyl phthalate (manufactured by J-PLUS Co., Ltd.)

H-6319: Zn-based stabilizer (manufactured by Sakai Chemical Industry Co., Ltd.: containing 35 mass % of zinc stearate)

ZN-3: Zinc laurate (manufactured by NITTO KASEI KOGYO K.K.)

HA LATEX: Natural rubber (manufactured by Reditex)

JSR 1502: Styrene butadiene rubber (manufactured by Koshigaya Rubber Industry Co., Ltd.)

ARKON P-9: C-9 Hydrogenated Petroleum Resin (Tackifire) (manufactured by Arakawa Chemical Industries, Ltd.)

ACTOR R: 4,4'-dithiodimorpholine (manufactured by Kawaguchi Chemical Industry Co., Ltd.)

ACCEL M: 2-mercaptobenzothiazole (manufactured by Kawaguchi Chemical Industry Co., Ltd.)

Calcium stearate: (manufactured by Sakai Chemical Industry Co., Ltd.)

Example 1

(1) TH-1000 (polyvinyl chloride resin). DINP (plasticizer). H-6319 (zinc compound), and stearic acid as a lubricant were melt-kneaded in the composition shown in Table 1 so as to be uniformly dispersed using a Banbury mixer. After melt-kneading, a substrate having a thickness of 150 μm was prepared with a calendar molding machine at a roll temperature of 165° C.

(2) A mixture emulsion (KT4612A, manufactured by Emulsion Technology Co., Ltd.) of a graft polymer latex obtained by graft-polymerizing methyl methacrylate to natural rubber and an acrylonitrile butadiene copolymer emulsion was applied by a gravure method to one side of the prepared substrate as a primer, and dried. Then, HA LATEX (natural rubber), JSR1502 (synthetic rubber), ARKON P-9 (adhesive imparting agent), ACTOR R (vulcanizing agent), and ACCEL M (vulcanizing auxiliary) were dissolved in toluene to be the adhesives having the compositions shown in Table 1. The mixed adhesive was applied by a comma method and dried to obtain the adhesive sheet. The adhesive sheet was wound into a tape log shape and then cut into a width of 10 mm to obtain a sample tape. The results of various characteristic evaluations are shown in Table 1.

Examples 2 to 11 and Comparative Examples 1 to 5

Sample tapes were obtained in the same manner as in Example 1 except that the type and composition of each component were changed as shown in Table 1. The results of various characteristic evaluations are shown in Table 1.

TABLE 1

| | | | Example | | | | | | | | | | | | Comparative Example | | | | |
|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 | 4 | 5 |
| Substrate | Composition (part by mass) | Polyvinyl chloride resin TH-1000 | 54 | 54 | 46 | 54 | 54 | 54 | 54 | 54 | 54 | 54 | 54 | 58 | 54 | 50.8 | 54 | 34 |
| | | Plasticizer DINP | 32 | 32 | 40 | 32 | 32 | 32 | 32 | 32 | 32 | 32 | | 28 | 32 | 32 | 32 | 52 |
| | | DIDP | | | | | | | | | | | 32 | | | | | |
| | | Zinc compound H-6319 | 0.8 | 1.8 | 1.8 | 4 | | | 1.8 | 1.8 | 1.8 | 1.8 | 1.8 | 1.8 | 0 | 5 | | 1.8 |
| | | ZN-3 | | | | | 1 | 1.8 | | | | | | | | | | |
| | | Lubricants Calcium stearate | | | | | | | | | | | | | | | | |
| | | Stearic acid | 13.2 | 12.2 | 12.2 | 10 | 13 | 12.2 | 12.2 | 12.2 | 12.2 | 12.2 | 12.2 | 12.2 | 14 | 12.2 | 13 | 12.2 |
| | | Zinc content (mass %) | 0.029 | 0.065 | 0.065 | 0.144 | 0.14 | 0.065 | 0.065 | 0.065 | 0.065 | 0.065 | 0.065 | 0.065 | 0 | 0.18 | 0.066 | 0.065 |
| | | Calcium content (mass %) | | | | | | | | | | | | | | | 1 | |
| | | Plasticizer content (mass %) | 32 | 32 | 40 | 32 | 32 | 32 | 32 | 32 | 32 | 32 | 32 | 28 | 32 | 32 | 32 | 52 |
| Adhesive | Composition (part by mass) | Natural rubber HA LATEX | 20 | 20 | 20 | 20 | 20 | 20 | 20 | 20 | 20 | 20 | 20 | 20 | 20 | 20 | 20 | 20 |
| | | Synthetic rubber JSR1502 | 39.1 | 39.1 | 39.1 | 39.1 | 39.1 | 39.1 | 39.1 | 39.6 | 37.5 | 37.5 | 37.5 | 39.1 | 39.1 | 39.1 | 39.1 | 39.1 |
| | | Tackifier ARKON P-9 | 40 | 40 | 40 | 40 | 40 | 40 | 40 | 40 | 40 | 40 | 40 | 40 | 40 | 40 | 40 | 40 |
| | | Vulcanizing agent ACTOR R | 0.9 | 0.9 | 0.9 | 0.9 | 0.9 | 0.9 | 2.5 | 0.4 | 2.5 | 2.5 | 2.5 | 0.9 | 0.9 | 0.9 | 0.9 | 0.9 |
| | | Vulcanizing auxiliary ACCEL M | 1.8 | 1.8 | 1.8 | 1.8 | 1.8 | 1.8 | 1.8 | 0.8 | 5 | 5 | 5 | 1.8 | 1.8 | 1.8 | 1.8 | 1.8 |
| | | Vulcanizing agent content (mass %) | 0.88 | 0.88 | 0.88 | 0.88 | 0.88 | 0.88 | 0.88 | 0.40 | 2.38 | 2.38 | 2.38 | 0.88 | 0.88 | 0.88 | 0.88 | 0.88 |
| | Adhesive layer thickness (μm) | | 25 | 25 | 25 | 25 | 25 | 30 | 35 | 25 | 25 | 25 | 25 | 25 | 25 | 25 | 25 | 25 |
| | Primer layer (KB-4615B) | | None | None | None | None | None | None | None | None | None | Formed | None | None | None | None | None | None |
| Evaluation | Flexibility at Low Temperature | | A | A | A | A | A | A | A | A | A | A | B | B | A | A | A | A |
| | Room Temperature Adhesive Force (25° C.) after storing at 120° C. for 3 hours (N/10 mm) | | 1.75 | 1.85 | 1.85 | 1.8 | 2 | 2.3 | 2.5 | 1.8 | 1.9 | 1.85 | 1.9 | 1.75 | 1.75 | 1.4 | 1.75 | 0.8 |
| | Low Temperature Adhesive Force (−20° C.) (N/10 mm) | | 1.5 | 1.6 | 1.6 | 1.8 | 1.8 | 2.1 | 2.3 | 1.5 | 1.7 | 1.6 | 1.8 | 0.7 | 1.5 | 1.2 | 1.4 | 0.6 |
| | Holding Force after storing at 120° C. for 4 hours (N/10 mm) | | 36 | 46 | 46 | 58 | 57 | 50 | 46 | 40 | 55 | 52 | 60 | 34 | 0 | 69 | 0 | 0 |

Good results were obtained in Examples 1-11. On the other hand, in Comparative Example 1 in which the amount of the plasticizer was small, the low temperature flexibility was not good and the low temperature adhesive force was inferior. In Comparative Example 5 in which a large amount of plasticizer was used, the adhesive force at low temperature was low, the adhesive force after storage was inferior, and the holding force after being left for a certain period was further lowered. In Comparative Example 2 in which the zinc compound was not added, the holding force after storage was inferior. In Comparative Example 3 in which the amount of the zinc compound was large, the adhesive force after storage was inferior. In Comparative Example 4 in which calcium stearate was used instead of the zinc compound, the holding force after storage was inferior.

The invention claimed is:

1. An adhesive tape comprising a substrate and an adhesive layer, wherein
   the adhesive layer is formed directly on the substrate or with another layer therebetween,
   the substrate contains a polyvinyl chloride resin, a plasticizer, and a zinc compound,
   a content of the plasticizer in the substrate is 30 to 50 mass % with respect to the total mass of the substrate,
   a content of a zinc atom in the substrate is 0.01 to 0.15 mass % with respect to the total mass of the substrate,
   the adhesive layer contains an adhesive including an adhesive component and a vulcanizing agent, and
   the vulcanizing agent includes at least one of sulfur and sulfur compounds, and
   a content of the vulcanizing agent is 0.1 to 5 mass % with respect to the total mass of the adhesive layer.

2. The adhesive tape of claim 1, wherein the plasticizer is a carboxylic acid ester.

3. The adhesive tape of any one of claim 1, wherein the adhesive further contains a vulcanizing auxiliary.

4. The adhesive tape of any one of claim 1, wherein the zinc compound is zinc stearate, zinc laurate, zinc oleate, zinc benzoate, zinc butyl benzoate, zinc amino acid, or zinc phosphate ester.

5. The adhesive tape of any one of claim 1, wherein the adhesive tape further comprises a primer layer between the adhesive layer and the substrate.

6. The adhesive tape of any one of claim 1, wherein the adhesive layer has a film thickness of 25 to 45 μm.

* * * * *